United States Patent [19]

Kempter et al.

[11] B  4,001,155
[45] Jan. 4, 1977

[54] PAINT BINDERS OF MANNICH BASES AND EPOXY RESINS

[75] Inventors: Firtz Erdmann Kempter, Mannheim; Güenther Sabelus, Lambsheim; Herbert Spoor, Limburgerhof, all of Germany

[73] Assignee: BASF Aktiengesellschaft, Ludwigshafen (Rhine), Germany

[22] Filed: Nov. 11, 1974

[21] Appl. No.: 522,629

[44] Published under the second Trial Voluntary Protest Program on March 16, 1976 as document No. B 522,629.

[30] Foreign Application Priority Data

Nov. 15, 1973 Germany .......................... 2357075

[52] U.S. Cl. ....................... 260/29.2 EP; 204/181; 260/33.4 EP; 260/37 EP; 260/831; 428/260
[51] Int. Cl.² ....................................... C08G 51/24
[58] Field of Search ......... 260/51.5, 47 EP, 47 EN, 260/831–833, 29.2 EP; 204/181; 106/14

[56] References Cited
UNITED STATES PATENTS

| | | | |
|---|---|---|---|
| 3,436,373 | 4/1969 | Cox et al. | 260/51.5 |
| 3,790,606 | 2/1974 | Sellet | 260/401 |

*Primary Examiner*—Theodore Morris
*Assistant Examiner*—T. Pertilla
*Attorney, Agent, or Firm*—Johnston, Keil, Thompson & Shurtleff

[57] ABSTRACT

Paint binders substantially free from epoxide groups and manufactured by reacting a. Mannich bases of
  $a_1$. condensed phenols,
  $a_2$. a secondary amine bearing at least 1 hydroxyalkyl group and
  $a_3$. formaldehyde with
b. at least one epoxy resin.

These binders are suitable, in the acid-protonized form, for use in cathodic immersion electrocoating of electrically conductive surfaces.

3 Claims, No Drawings

PAINT BINDERS OF MANNICH BASES AND EPOXY RESINS

This application discloses and claims subject matter described in German Patent Application No. P 23 57 075.4, filed Nov. 15, 1973, which is incorporated herein by reference.

Cationic electrocoat systems are known and are described, for example, in German Published Applications Nos. 1,930,949 and 2,033,770.

However, the known binders for cathodic deposition require improvement in some of their properties, for example their throwing power (see for example Western Paint Review, 1972, 57, No. 6, pp.144 et seq.) and their suspension stability, for a number of particularly important applications, e.g. for use in the automobile industry.

One drawback of these binders for cathodic deposition is that their manufacture requires a high proportion of expensive starting materials such as epoxy resins.

Furthermore, the products of, say, German Published Application No. 1,930,949 make it possible to prepare coating baths only at acid pH's below 5.5.

It is an object of the present invention to provide paint binders which are cheaper to produce and are easier to process by the cathodic deposition method, show improvements as regards throwing power and, in particular, suspension stability, and which retain their good stability when processed at neutral pH's or, even better, at slightly alkaline pH's. Surprisingly, this is achieved by the use of binders which are reaction products of specific Mannich bases with epoxy resins. German Published Application No. 2,033,770 mentions, inter alia, reaction products of epoxide group-containing resins and Mannich bases based on phenol, formaldehyde and dimethylamine, but these products contain substantial amounts of free epoxide groups, unlike the reaction products of the present invention. It is an important feature of the paint binders of the present invention that they contain no or only insignificant amounts of free epoxide groups.

The invention relates to substantially epoxide group-free paint binders which have been obtained by reacting a. Mannich bases of
$a_1$. condensed phenols,
$a_2$. at least one secondary amine containing at least one hydroxyalkyl group or a mixture of such a secondary amine with one other secondary or primary amine and
$a_3$. formaldehyde or formaldehyde-donating compounds with
b. at least one epoxide resin containing 1,2-epoxide groups, from 0.6 to 1.3 epoxide groups of component (b) being present for each molecule of component $(a_1)$.

The preferred paint binders of the invention are those obtained by reacting from 40 to 85% by weight and preferably from 50 to 80% by weight of component (a) with from 15 to 60% and preferably from 25 to 50% by weight of component (b) and containing from 0 to 40% by weight of one or more other paint binders.

Particularly preferred paint binders of the invention are those in the manufacture of which component $(a_2)$ is diethanolamine or an alkylmethanolamine or a mixture of diethanolamine and one other secondary or primary amine such as dibutylamine and/or dipentylamine and/or dihexylamine.

In a particularly preferred embodiment of the present invention, the preparation of the Mannich base is effected with a formaldehydedonating compound such as paraformaldehyde in amounts virtually equivalent to the amount of amine used, such preparation being carried out in an alcohol such as isopropanol or isobutanol, and the component (a) is directly reacted with component (b), i.e. without continued reaction with the formaldehyde.

One special advantage of the paint binders of the invention is that very small amounts of an acid are required to protonize them for the electrophoretic processing thereof in the usual manner. They may then be used for cathodic electrocoating of electrically conductive surfaces, particularly metal articles.

The paint binders of the invention are manufactured with comparatively small amounts of epoxy resin and produce coatings showing valuable properties. When protonized with acids, they are dilutable with water; these paint binders are distinguished, in particular, by a number of valuable properties when used in cathodic electrocoating techniques: they may be cathodically deposited in a pH range of from 6 to 10.2 and preferably from 7 to 9, they exhibit high suspension stability and show good throwing power. The coatings obtained therewith show good anticorrosive properties, good flow characteristics even without the addition of conventional flow auxiliaries, a high resistance to solvents and a high degree of adhesion to metal surfaces, particularly phosphated metal surfaces. Compared with the epoxide group-containing binders described in German Published Application No. 2,033,770, the binders of the invention exhibit a higher stability of the resinous substance, the possibility of maintaining a specific molecular weight of the resins and better suspension stability even at pH's between 7 and 9.

The following comments relate to the components used in preparing the paint binders of the invention:

a. the Mannich bases are prepared from
$a_1$. condensed phenols,
$a_2$. secondary amines and
$a_3$. formaldehyde.

Suitable condensed phenols $(a_1)$ are polyhydric phenols containing one or more aromatic radicals, particularly suitable phenols being those of the general formula:

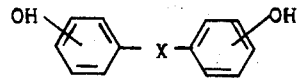

wherein the OH groups are in the ortho- and/or para-position to X and X denotes a straight-chain or branched-chain divalent aliphatic radical of from 1 to 3 carbon atoms or denotes $>SO_2$, $>SO$ or $-O-$. A particularly preferred compound is bisphenol A.

At least some of the secondary amines $(a_2)$ should be such as contain at least one hydroxyalkyl group. Suitable secondary amines having at least one hydroxyalkyl group are for example alkylethanolamines or alkylisopropanolamines of from 1 to 6 carbon atoms in the alkyl group and, preferably, dialkanolamines such as diethanolamine.

Suitable secondary amines $(a_2)$ which may be blended with the above amines are those of the general formula

where $R^1$ and $R^2$ are the same or different and each individually denotes a straight-chain or branched-chain aliphatic radical of from 1 to 14 carbon atoms, optionally containing alkoxy groups. Examples of such suitable secondary amines are di-n-butylamine, di-n-propylamine, diisopropylamine, di-n-hexylamine, di-n-octylamine, diethylhexylamine and di-2-alkoxyethylamines such as di-2-methoxyethylamine, di-2-ethoxyethylamine and di-2-butoxyethylamine, and those in which $R^1$ and $R^2$ are joined together to form a ring, for example morpholine or piperidine.

Preferred suitable secondary amines are for example diethanolamine and mixtures thereof with di-n-butylamine, di-n-hexylamine or di-2-methoxyethylamine and with mixtures of said secondary amines. The secondary amines may, if desired, be partly replaced, for example to an extent of up to 10% by weight, by primary amines such as ethanolamine, methoxyethylamine, n-butylamine and n-hexylamine. Preferred secondary amines ($a_2$) are diethylamine and mixtures thereof with ethanolamine, methoxyethylamine, n-butylamine or n-hexylamine.

The formaldehyde ($a_3$) is preferably in the form of an alcoholic, e.g. butanolic formaldehyde solution or in the form of formaldehydedonating compounds such as paraformaldehyde, or mixtures thereof.

The preparation of the Mannich condensates is carried out by the conventional methods described in the literature, cf. for example Houben-Weyl, Methoden der organischen Chemie, Vol. XI/1, p. 731, 1957. In general, the components ($a_1$), ($a_2$) and ($a_3$) are reacted in a molar ratio of from 1:2.1:2.2 to 1:3.2:3.35.

The proportions of the starting materials used are determined by the functionality of the polyhydric phenols, e.g. of bisphenol A. For example, up to 4 moles of secondary amine may be reacted with 1 mole of bisphenol A.

Since a residue of active sites is required for resin formation and crosslinking and since good coating bath, reactivity and coating properties are achieved, for example, using a mixture of diethanolamine and other secondary amines with engagement of from 1.3 to 3.5 and preferably from 1.6 to 3.2 of the active sites on the bisphenol A, this is the particularly preferred range.

Such suitable Mannich bases may be represented, for example, by the formula:

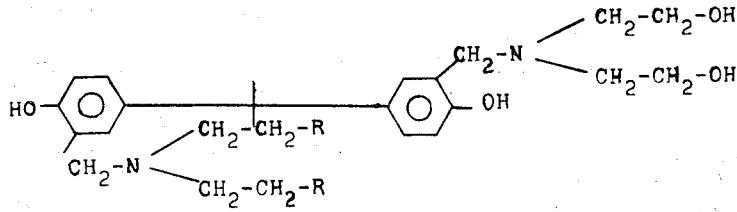

where R denotes $CH_3$, lower alkyl of up to 12 carbon atoms, $-O-CH_3$ or $O-C_3H_7$.

By varying the properties of the various amines it is possible to control the electro-dip coating properties. For example, the ratio of diethanolamine or alkylethanolamine to dibutylamine, dihexylamine, diethylhexylamine or dioctylamine governs the dispersibility of the resin and the reactivity, flow properties, crosslinking and elasticity thereof. These properties are also influenced by the degree of etherification of the phenolic OH groups of component ($a_1$).

The Mannich condensates (a) are used for the production of the paint binders of the invention in an amount of from 40 to 85% and preferably from 50 to 80%, by weight, and are reacted with from 15 to 60% and preferably from 25 to 50%, by weight, of epoxy resin (b), provided that the component (a) is combined with component (b) in such proportions that from 0.6 to 1.3 and preferably from 1 to 1.2 epoxide groups of component (b) are present for each molecule of ($a_1$).

(b) Suitable epoxy resins are the usual polyepoxy compounds such as
1. the reaction products of polyhydric phenols, particularly those of the above formula

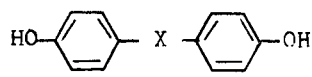

preferably bisphenol A and epichlorohydrin. Suitable commercial products based on such compounds are for example EPIKOTE 828, 1001, 1004 by Shell or EPOXI 1/33 (reaction product of bisphenol A and epichlorohydrin having a molecular weight of about 700 to 800) by Chemapol, Czechoslovakia, or
2. the reaction products of polyhydric alcohols such as ethylene glycol, propylene glycol, ethylene diglycol, pentaerythritol, trimethylol propane and glycerol with epichlorhydrin, for example EPIKOTE 162 (reaction product of pentaerythritol with 3 moles of epichlorohydrin) by Shell.

In the reaction between the Mannich base and the polyepoxide it can be assumed that the main reaction is the basic catalytic etherification of the phenolic OH groups. Another possibility is the reaction with the primary alcoholic OH groups of the diethanolaminomethyl radical. Since it is known that alkylethanolaminomethyl groups also have a crosslinking action in the cationic system of the invention, this side reaction may be tolerated. The undesirable quaternizing reaction at the nitrogen atom and the reaction with the solvent used must also be considered.

The reaction between component (a) and component (b) is generally carried out at temperatures of from 20° to 100°C and preferably from 60° to 70°C, preferably in the presence of organic solvents such as alcohols and glycol ethers.

It is important that the paint binders of the invention contain o-alkanolaminomethylphenol radicals, o-alkylaminomethylphenol radicals or o-diethanolaminomethylphenol radicals.

The product of the invention obtained by reacting component (a) with component (b) is substantially free from epoxide groups and nver contains more than 0.5% of epoxide groups per molecule.

This reaction may also be carried out in the presence of other cationic condensates or polymers, for example the salts of acids with cationic acrylic or vinyl copolymers containing nitrogen-base groups, e.g. as described in German Published Application No. 1,276,260, or salts of acids with cationic condensates of polyfunctional aminoalcohols containing tertiary nitrogen atoms, carboxyl group-containing polymers and phenoplast or aminoplast resins, e.g. as described in German Published Application No. 1,930,949, or in the presence of other neutral resins such as polyacrylates or other polymers or condensates of the amide/formaldehyde type. Of these, up to about 40% and preferably from 5 to 30%, by weight of the total weight of (a) plus (b), is used. These modifying components may be added to the reaction product of (a) and (b) or at a subsequent stage.

The preferred order of events or reaction stages is that given above.

The paint binders of the invention may be diluted with conventional paint solvents such as isopropanol, decanol, ISANOL, or with aqueous organic solvents or solvent mixtures, if desired together with pigments, fillers and other auxiliaries, and are applied by conventional coating methods such as spraying, dip-coating or flooding, onto the substrate to be coated or painted, e.g. wood, metal, glass and ceramics, whereupon the coating is dried and cured at temperatures above 170°C. The resulting coatings are distinguished, for example, by a high degree of hardness and resistance to solvents.

However, we prefer to use the paint binders of the invention after protonization with acids, for example phosphoric acid and derivatives thereof and preferably with water-soluble carboxylic acids such as acetic acid, formic acid and lactic acid. The protonized paint binder is water-dilutable and may be applied by the above conventional coating methods to give coatings having very valuable properties However, the degree of protonization should be as low as possible.

The preferred use of the protonized paint binders of the invention is the cathodic electrocoating of electrically conductive surfaces such as metal articles and sheeting of brass, copper, aluminum, iron and steel, which may, if desired, be chemically pretreated, e.g. phosphated.

The aqueous solutions or dispersions of the paint binders of the invention, at least partially in the form of a salt of a watersoluble carboxylic acid, may contain or be blended with auxiliaries capable of electrochemical deposition by cataphoresis, for example pigments, soluble dyes, solvents, flow improvers, stabilizers, curing catalysts, antifoaming agents and other additives.

For cathodic electrocoating purposes, a solids content of the coating bath is adjusted to from 5 to 20% by weight by dilution with de-ionized water. Deposition generally takes place at temperatures of from 15° to 40°c over a period of from 1 to 2 minutes and at bath pH's of from 6 to 10.2 and preferably from 7.0 to 9.5 and at deposition potentials of from 50 to 500 volts. Following rinsing of the cathodically deposited film on the electrically conducting article, the film is cured at from about 170° to 220°C for from 10 to 30 minutes and preferably at from 180° to 200°C for 20 minutes.

The compositions of the invention, when applied by cathodic deposition, provide coatings of excellent mechanical properties such as a very high degree of hardness and mar-resistance, very good resilience and good adhesion to the substrate. Furthermore, the layers are very suitable for overbaking.

In addition, the coatings obtained are distinguished by a high resistance to solvents and good stability in the salt spray test.

In the following Examples the parts and percentages are by weight.

EXAMPLE 1

533 parts (4.25 moles) of 24% formaldehyde solution in isopropanol are added dropwise, at from 20° to 25°C, to 375.0 parts (1.65 moles) of bisphenol A, 260.0 parts (2.48 moles) of diethanolamine, 215.0 parts (1.67 moles) of di-n-butylamine and 200 parts of isopropanol under nitrogen as protective gas. The mixture is then stirred for 30 minutes at 30°C and then heated for 3 hours at 80°C. There are then added 150.0 parts of EPOXIN 162 (BASF) and 375 parts of EPOXI 1/33 (Chemapol), together providing 1.61 mole equivalents of epoxide groups. The batch is then held at 70°C for 5 hours and 170.0 parts of amide/formaldehyde condensate (e.g. PLASTIGEN G (BASF) ) are stirred in. There is obtained a clear resin having a solids content of 67.3%. The average molecular weight is from 1,000 to 1,300. Using 2.0 parts of acetic acid to 100 parts of solid resin and diluting with demineralized water, there are produced 3 liters of a 10% dispersion which may be deposited from a bath at a temperature of 30°C, a pH of 8.6 and a deposition potential of from 180 to 230 volts per 30°C. The mixture is applied to steel sheeting which has been treated with, say, BONDER 1040 (Metallgesellschaft), and the coating is baked for 20 minutes at 190°C to give a smooth, glossy, hard and very elastic film of very good impact resistance. When this bath is aged for 60 days at 30°C, satisfactory coatings are still obtained under identical conditions.

EXAMPLE 2

138 parts (4.6 moles) of paraformaldehyde are added to 375.0 parts (1.65 moles) of bisphenol A, 260.0 parts (2.48 moles) of diethanolamine, 2.15 parts (1.67 moles) of di-n-butylamine, 250.0 parts of isopropanol and 250 parts of isobutanol at from 20° to 25°C under nitrogen as protective gas and the mixture is stirred for 30 minutes at 30°C. Stirring is then continued for 3 hours at 80°C. There are then added 164.5 parts of EPOXIN 162 (BASF) and 412.0 parts of EPOXI 1/33 (Chemapol), together providing 1.75 mole equivalents of epoxide groups. The mixture is held at 70°C for 5 hours.

197 parts of a cationic acrylate based on styrene, butyl acrylate, hydroxypropyl acrylate (46.5% solids in isopropanol) and 133.0 parts of PLASTIGEN G (BASF) are then stirred into the batch. There is obtained a clear resin having a solids content of 70.5% and an average molecular weight of from 1,000 to 1,300. 100.0 parts of the solid resin are then protonized with 1.5% of acetic acid. As in Example 1, BONDER-treated sheets of metal are coated in a bath (pH 8.7) in a 3 liter vessel and then cured for 20 minutes at 190°C. Coatings having excellent properties are obtained. The thickness of the layer is 0.02 mm, the Koenig hardness is 202 seconds and the Erichsen value is 8.0 mm.

EXAMPLE 3

Using a pigment paste consisting of 300.0 parts of titanium dioxide KRONOS RN 59 (Titangesellschaft), 45.0 parts of LUCONIL BLACK X 60 (aqueous suspension of carbon black) (BASF), 135.0 parts of dimineralized water and 50.0 parts of isopropanol there is prepared an electrocoating bath (7 liters) in which the protonized binder described in Example 2 is present in a binder/pigment ratio of 1:0.3. The bath has a pH of 8.6 and a solids content of 10%.

Steel sheeting pretreated with BONDER is coated at a temperature of 30°C and a deposition potential of up to 350 volts. On curing (20 minutes at 190°C), there were obtained coatings of a thickness of from 0.015 to 0.020 mm and exhibiting excellent impact resistance.

EXAMPLE 4

335.0 parts of EPIKOTE 828 (Shell) were added under a blanket of nitrogen to the Mannich base produced as in Example 2, at 80°C, giving a molar equivalent of 1.874 epoxide groups. The mixture is reacted for 5 hours at 70°C. 197.5 parts of a cationic acrylate (solids content 46.5%) and 133.0 parts of PLASTIGEN G are then stirred into the solution. The solids content of the clear resin is 62.2%. The solid resin is protonized with 1.6% of acetic acid and is deposited onto BONDER-treated steel sheeting from a 1 liter bath having a solids content of 10%, at a temperature of 30°C and a bath pH of 9.0, the deposition potential being from 180 to 230 volts.

The properties of the bath and of the coating are excellent.

EXAMPLE 5

570.0 parts of 24% formaldehyde solution in isobutanol are added dropwise, at 30°C under a blanket of nitrogen, to 375.0 parts (1.65 moles) of bisphenol A. 280.0 parts (2.67 moles) of diethanolamine, 185.0 parts (1.43 moles) of di-n-butylamine and 200 parts of isopropanol. The batch is then stirred at 30°C for 30 minutes and at 80°C for 3 hours. There are then added 150.0 parts of EPOXIN 162 (BASF) and 375.0 parts of EPOXI 1/33 (Chemapol) together providing 1.61 mole equivalents of epoxide groups, the mixture then being held at 70°C for 5 hours. There is obtained a clear resin having a solids content of 68.5%.

The resin is stored for approx. 5 months at 25°C and a 10% dispersion having a pH of 8.1 is produced using 1.70% of acetic acid (based on solid resin). Sheet steel pretreated with BONDER 1040 (Metallgesellschaft) is cathodically coated in the manner described in Example 1. There are obtained films having a thickness of 0.015 to 0.020 mm which are of excellent appearance and have the desired physical properties.

EXAMPLE 6

138.0 parts (4.6 moles) of paraformaldehyde are added, at from 20° to 25°C under a blanket of nitrogen, to 375.0 parts (1.65 moles) of bisphenol A, 260.0 parts (2.48 moles) of diethanolamine, 309.0 parts of di-n-hexylamine (1.67 moles), 250.0 parts of isopropanol and 250.0 parts of isobutanol. The mixture is stirred at 30°C for 30 minutes. There are then added 150.0 parts of EPOXIN 162 (BASF) and 375 parts of EPOXI 1/33, together providing 1.61 mole equivalents of epoxide groups. The batch is held at 70°C for 5 hours.

The solids content of the resin is 72.0%. It is tested as described in Example 1 and is found to give similar results.

We claim:

1. An aqueous paint binder for the cathodic electrocoating of electrically conductive metal surfaces, comprising a substantially epoxide group-free reaction product of
   a. Mannich bases of
      $a_1$.

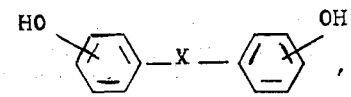

wherein X is a straight-chain or branched-chain divalent aliphatic radical of from 1 to 3 carbon atoms or is >SO$_2$,>SO or —O—
   $a_2$. at least one secondary mono amine containing at least one hydroxyalkyl group, or a mixture of said secondary amine with one other secondary or primary mono amine, and
   $a_3$. formaldehyde or a formaldehyde-donating compound, with
   b. at least one epoxide resin containing 1,2 epoxide groups, the components (a) and (b) being combined in such quantities that from 0.6 to 1.3 epoxide groups of component (b) are present for each molecule of component ($a_1$).

2. A paint binder as set forth in claim 1 and which has been obtained by reacting from 40 to 85% by weight of component (a) with from 60 to 15% by weight of component (b) and which contains from 0 to 40% by weight of one or more other paint binders.

3. A paint binder as set forth in claim 1, wherein the component ($a_2$) is diethanolamine or alkylethanolamine or a mixture of diethanolamine and one other secondary or primary amine.

* * * * *